(12) United States Patent
Zhang et al.

(10) Patent No.: US 11,128,022 B2
(45) Date of Patent: Sep. 21, 2021

(54) LIQUID INJECTION DEVICE (71) Applicant: CONTEMPORARY AMPEREX TECHNOLOGY CO., LIMITED, Fujian (CN)

(72) Inventors: Zhiqiang Zhang, Fujian (CN); Xiaohui Zeng, Fujian (CN); Zhihui Wang, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/133,510

(22) Filed: Dec. 23, 2020

(65) Prior Publication Data

US 2021/0119311 A1 Apr. 22, 2021

Related U.S. Application Data (63) Continuation of application No. PCT/CN2019/105653, filed on Sep. 12, 2019.

(30) Foreign Application Priority Data

Sep. 18, 2018 (CN) .......................... 201821521223.2

(51) Int. Cl.
*H01M 2/36* (2006.01)
*G01G 19/03* (2006.01)
(Continued)

(52) U.S. Cl.
CPC ........ *H01M 50/609* (2021.01); *G01G 11/003* (2013.01); *G01G 19/03* (2013.01)

(58) Field of Classification Search
CPC ..... G01G 11/003; G01G 19/03; H01M 50/60; H01M 50/609
See application file for complete search history.

(56) References Cited

U.S. PATENT DOCUMENTS 5,137,009 A * 8/1992 Posch ..................... F23L 15/00
126/77
5,256,835 A * 10/1993 Rydzak ................ G01G 19/005
177/145

(Continued)

FOREIGN PATENT DOCUMENTS

CN 105355833 A 2/2016
CN 206930349 U 1/2018
(Continued)

*Primary Examiner* — Randy W Gibson
(74) *Attorney, Agent, or Firm* — Scully Scott Murphy & Presser (57) ABSTRACT The present disclosure provides a liquid injection device, including a conveying mechanism, a weighing mechanism, a lifting mechanism and a guide mechanism. The weighing mechanism is positioned below the conveying mechanism. The lifting mechanism is configured to transfer a battery on the conveying mechanism to the weighing mechanism. The guide mechanism includes a first guide plate, a second guide plate and a power member. A distance between the second guide plate and the first guide plate may be adjusted through the power member, so that the liquid injection device may be compatible with batteries with different models. It is unnecessary to perform model change operation when the battery is changed, thus improving production efficiency.

15 Claims, 5 Drawing Sheets (51) Int. Cl.
  G01G 11/00     (2006.01)
  H01M 50/609    (2021.01)

(56) References Cited

U.S. PATENT DOCUMENTS

| | | | | |
|---|---|---|---|---|
| 5,306,877 | A * | 4/1994 | Tas | B07C 5/18 |
| | | | | 177/145 |
| 5,326,938 | A * | 7/1994 | Tolson | G01G 11/003 |
| | | | | 177/145 |
| 8,178,798 | B2 * | 5/2012 | Edrich | G01G 15/00 |
| | | | | 177/145 |
| 8,237,067 | B2 * | 8/2012 | Troisi | G01G 11/003 |
| | | | | 177/145 |
| 9,698,409 | B2 | 7/2017 | Watanabe | |
| 2015/0162594 | A1 | 6/2015 | Watanabe | |

FOREIGN PATENT DOCUMENTS

| | | |
|---|---|---|
| CN | 108039448 A | 5/2018 |
| CN | 208690379 U | 4/2019 |

\* cited by examiner

LIQUID INJECTION DEVICE

CROSS-REFERENCE TO RELATED APPLICATIONS

This application is a continuation of International Application No. PCT/CN2019/105653, filed on Sep. 12, 2019, which claims priority to Chinese Patent Application No. 201821521223.2, filed on Sep. 18, 2018. Both of the aforementioned applications are hereby incorporated by reference in their entireties.

TECHNICAL FIELD

The present disclosure relates to the technical field of batteries, and in particular, to a liquid injection device.

BACKGROUND

A liquid injection process is one of the important processes in lithium battery production, and the amount of electrolyte in the battery directly affects the quality of the battery. Therefore, it is particularly important to accurately weigh the amount of the electrolyte injected into the battery on the liquid injection device.

A traditional liquid injection device usually includes a conveying mechanism, a weighing mechanism and a mechanical arm for transferring the battery on the conveying mechanism to the weighing mechanism. There is a risk that the battery falls and damages the weighing mechanism (such as an electronic scale) in the transportation process of the mechanical arm; therefore, in an existing liquid injection device, the weighing mechanism is usually arranged below the conveying mechanism, the lifting mechanism is configured to drive the conveying mechanism to move up and down relative to the weighing mechanism, and the weighing mechanism directly supports the battery and weighs the battery after the conveying mechanism descends under the action of the lifting mechanism. Although the arrangement mode prevents the battery from falling and damaging the weighing mechanism, large weighing error is increased by that the battery is liable to shake when the conveying mechanism moves up and down. In addition, the existing liquid injection device is usually only for the battery with a specific model, and it is necessary to perform model change operation when the battery with another model is weighed.

SUMMARY

In view of the problems in the background art, an objective of the present disclosure is to provide a liquid injection device. The liquid injection device is compatible with the batteries with different models; furthermore, the battery can be fixed during weighing, thus greatly reducing the weighing error.

To achieve the above objective, the present disclosure provides a liquid injection device, including a conveying mechanism, a weighing mechanism, a lifting mechanism and a guide mechanism. The conveying mechanism conveys a battery along a length direction, the weighing mechanism is positioned below the conveying mechanism along a height direction, and the lifting mechanism is configured to generate relative motion between the conveying mechanism and the weighing mechanism, so that the battery on the conveying mechanism is transferred to the weighing mechanism. The guide mechanism includes: a first guide plate, positioned on one side of the battery along a width direction; a second guide plate, positioned on the other side of the battery along the width direction; and a power member, fixedly connected to the second guide plate for driving the second guide plate to move relative to the first guide plate along the width direction. When the conveying mechanism conveys the battery, the second guide plate and the first guide plate are spaced from the battery along the width direction. When the weighing mechanism weighs the battery, the second guide plate and the first guide plate clamp the battery together.

The number of the power member is consistent with the number of the second guide plate. There is one second guide plate, which is positioned on one side of the first guide plate along the width direction; or there are two second guide plates, which are positioned on two sides of the first guide plate along the width direction.

The liquid injection device further includes: a first fixed frame, configured to mount the conveying mechanism; and a second fixed frame, spaced from the first fixed frame and configured to mount the weighing mechanism.

The lifting mechanism includes: a cylinder body; and a telescopic rod, one end of the telescopic rod being telescopically connected to the cylinder body and the other end of telescopic rod being fixedly connected to the conveying mechanism or the weighing mechanism.

The conveying mechanism includes: two mounting plates, positioned above the first fixed frame and spaced along the width direction; a plurality of conveying rollers, spaced along the length direction, each of the conveying rollers being rotatably mounted between the two mounting plates; and a driving member driving the plurality of conveying rollers to rotate to convey the battery.

The first guide plate of the guide mechanism includes: a guide portion, positioned above the plurality of conveying rollers and arranged between the two mounting plates of the conveying mechanism; and two supporting portions, positioned at two ends of the guide portion along the length direction for supporting the guide portion. The second guide plate is positioned above the plurality of conveying rollers and arranged between the two mounting plates of the conveying mechanism. The power member is fixed to the mounting plates of the conveying mechanism.

The weighing mechanism includes: a weighing supporting block, configured to support the battery during weighing; and a weighing sensor, positioned below the weighing supporting block.

The weighing supporting block includes: a main body portion, positioned above the weighing sensor; and a plurality of protruded portions, spaced along a length direction, each of the protruded portions being protruded out of the main body portion along a height direction. The plurality of protruded portions is respectively positioned between the corresponding adjacent two conveying rollers, extend above the corresponding conveying rollers and support the battery.

The conveying mechanism further includes: two first supporting plates, spaced along the length direction, each of the first supporting plates being positioned between the two mounting plates and the first fixed frame. There are two lifting mechanisms. The cylinder body of each of the lifting mechanisms is fixed to the first fixed frame, and the other end of the cylinder body is fixedly connected to one first supporting plate of the conveying mechanism. After the conveying mechanism descends under the action of the lifting mechanism, the weighing mechanism supports the battery and weighs the battery.

The weighing mechanism further includes: a second supporting plate, positioned between the weighing sensor and the second fixed frame. There is one lifting mechanism. The cylinder body of the lifting mechanism is fixed to the second fixed frame, and the other end of the cylinder body is fixedly connected to the second supporting plate of the weighing mechanism. After the weighing mechanism ascends under the action of the lifting mechanism, the weighing mechanism supports the battery and weighs the battery.

Beneficial effects of the present disclosure are as follows:

In the liquid injection device of the present disclosure, a distance between the second guide plate and the first guide plate of the guide mechanism may be adjusted through the power member, so that the liquid injection device of the present disclosure may be compatible with batteries with different models. It is unnecessary to perform model change operation when the model of the battery is changed, thus improving production efficiency. Since a gap between the second guide plate and the first guide plate forms a guide channel in the length direction of the battery when the conveying mechanism conveys the battery, the guide mechanism may limit the battery in the width direction, thereby preventing the battery from being deviated towards two sides of the width direction in the conveying process. Furthermore, the battery is fixed by the guide mechanism when being weighed by the weighing mechanism, so that battery shaking is avoided and weighing error is greatly reduced.

description of reference numerals is as follows:

| 1 conveying mechanism | 41 first guide plate |
|---|---|
| 11 mounting plate | 411 guide portion |
| 12 conveying roller | 412 supporting plate |
| 13 driving member | 42 second guide plate |
| 14 first supporting plate | 43 power member |
| 2 weighing mechanism | 5 positioning mechanism |
| 21 weighing supporting block | 51 fixed portion |
| 211 main body portion | 52 extending portion |
| 212 protruded portion | 53 stop portion |
| 22 weighing sensor | 6 first fixed frame |
| 23 second supporting plate | 7 second fixed frame |
| 3 weighing mechanism | B battery |
| 31 cylinder body | L length direction |
| 32 telescopic rod | H height direction |
| 33 guide rod | W width direction |
| 4 guide mechanism | |

DESCRIPTION OF EMBODIMENTS

To make the objectives, technical solutions, and advantages of the present application clearer, the present application is further described below in detail with reference to the accompanying drawings and embodiments. It should be understood that the specific embodiments described herein are only for explaining the present application, rather than for limiting the present application.

In the description of the present application, unless otherwise specifically specified or limited, the terms "first" and "second" are only for description and cannot be interpreted as an indication or implication of relative importance; the term "a plurality" means two or more than two; unless otherwise specified or described, the terms "connection", "fixation" and the like should be understood in a broad sense, for example, "connection" may be fixed connection, may also be detachable connection, or integrated connection, or electric connection, or signal connection; and "connection" may be direct connection and may also be indirection connection through an intermediate medium. A person of ordinary skill in the art may understand specific meanings of the above-mentioned terms in the present application based on the specific situation.

In the description of the specification, it should be understood that azimuth words such as "upper", "lower" and the like described in the embodiment of the present application are described from the angle of the accompanying drawings, and should not be understood as a limitation of the embodiment of the present application. In addition, in the context, it should be understood that when it is mentioned that one component is connected "above" or "below" another component, the component can be directly connected "above" or "below" another component, and may be indirectly connected "above" or "below" another component through an intermediate component.

Referring to FIGS. 1 to 5, the liquid injection device of the present disclosure includes: a conveying mechanism 1, a weighing mechanism 2, a lifting mechanism 3, a guide mechanism 4, a positioning mechanism 5, a first fixed frame 6, a second fixed frame 7 and a control system (not shown).

Figure 1:
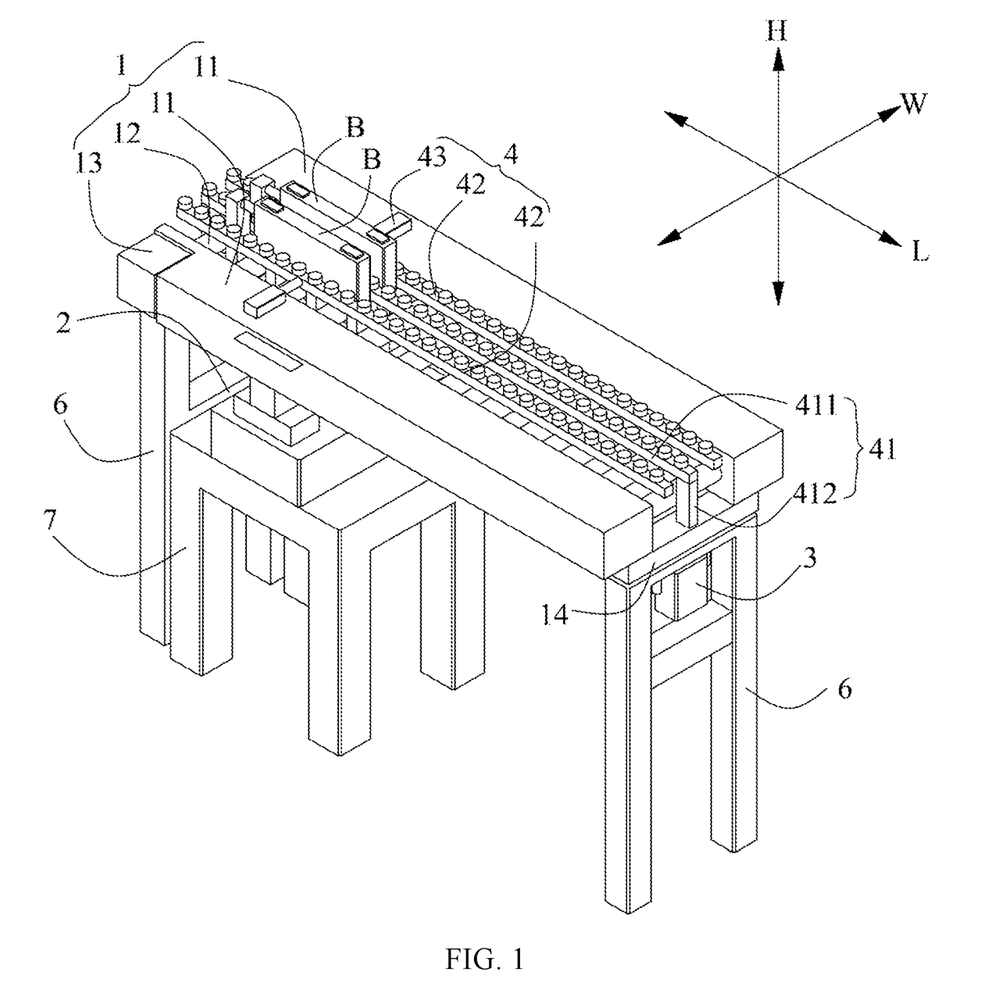
FIG. 1 is a stereogram observed from an angle of view according to a liquid injection device of the present disclosure, where a lifting mechanism is fixedly arranged on a first fixed frame.
Figure 2:
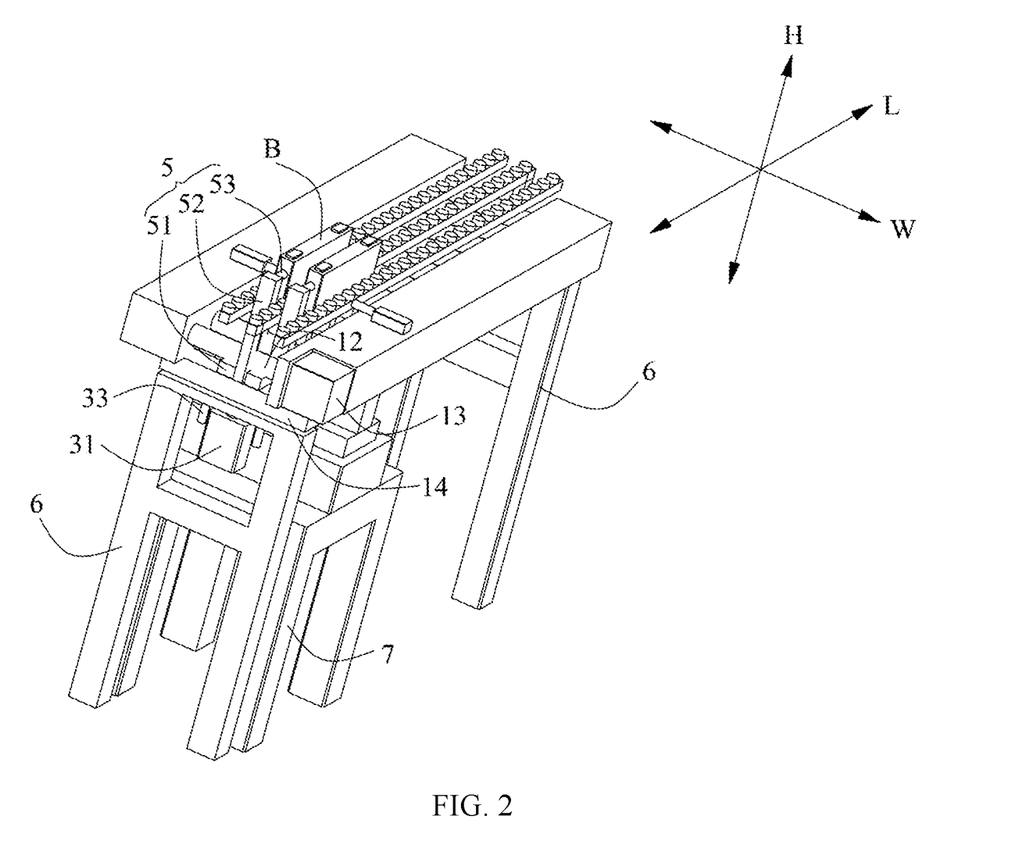
FIG. 2 is a stereogram observed from another angle of view according to a liquid injection device of the present disclosure.
Figure 3:
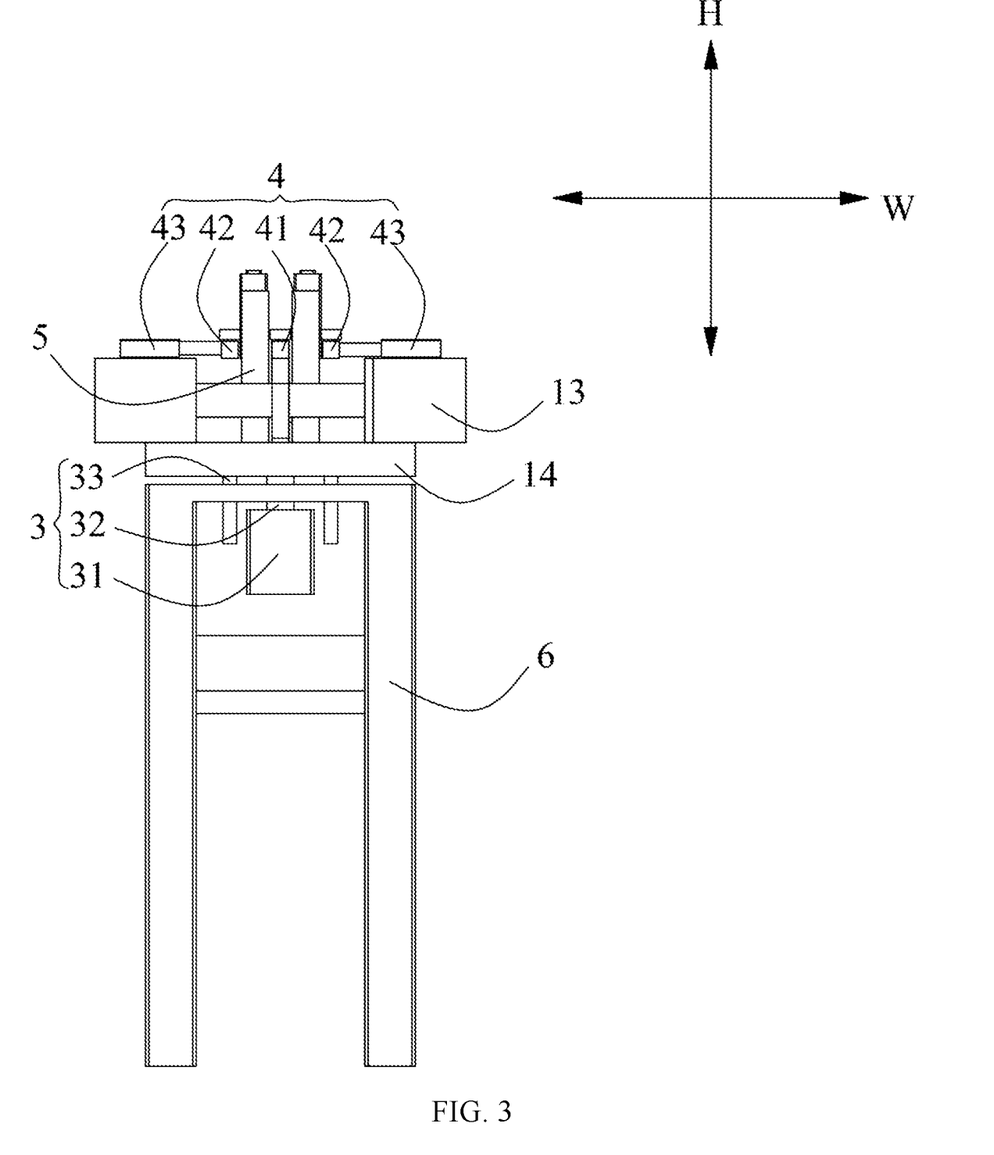
FIG. 3 is a front view of FIG. 2.

Referring to FIGS. 1 to 3, the conveying mechanism 1 is positioned above the weighing mechanism 2 along a height direction H and is supported by the first fixed frame 6. The conveying mechanism 1 is configured to convey a battery B along a length direction L. Specifically, the conveying mechanism 1 may include two mounting plates 11, a plurality of conveying rollers 12 and a driving member 13.

Referring to FIGS. 1 to 3, the two mounting plates 11 are positioned above the first fixed frame 6, parallel to each and spaced along a width direction W. The plurality of conveying rollers 12 are positioned between the two mounting plates 11, parallel to each other along the length direction L and spaced from each other; and each of the conveying rollers 12 is rotatably mounted between the two mounting plates 11. The driving member 13 (may be, but is not limited to a motor) generates power and drives the plurality of conveying rollers 12 to rotate. The battery B is placed on the plurality of conveying rollers 12 of the conveying mechanism 1. After the driving member 13 is started, the plurality of conveying rollers 12 starts to rotate and convey the battery B.

The driving member 13 and the plurality of conveying rollers 12 may in transmission connection through cooperation of a drive chain wheel, a driven chain wheel and a chain, and may also be in transmission connection through a belt transmission mechanism or a gear transmission mechanism.

In one embodiment, the conveying mechanism 1 may be directly placed on a first fixed frame 6 through two mounting plates 11. In another embodiment, referring to FIGS. 1 to 3, the conveying mechanism 1 may further include: two first supporting plates 14 which are spaced from each other along a length direction L. Each of the first supporting plates 14 is positioned between the two mounting plates 11 and the first fixed frame 6. At this time, the conveying mechanism 1 may be placed on the first fixed frame 6 through the two first supporting plates 14.

Referring to FIGS. 1 to 5, the weighing mechanism 2 is positioned below the conveying mechanism 1 along a height direction H and is supported by a second fixed frame 7 for weighing a battery B. Specifically, the weighing mechanism 2 may include a weighing supporting block 21, a weighing sensor 22 and a second supporting plate 23.

Figure 4:
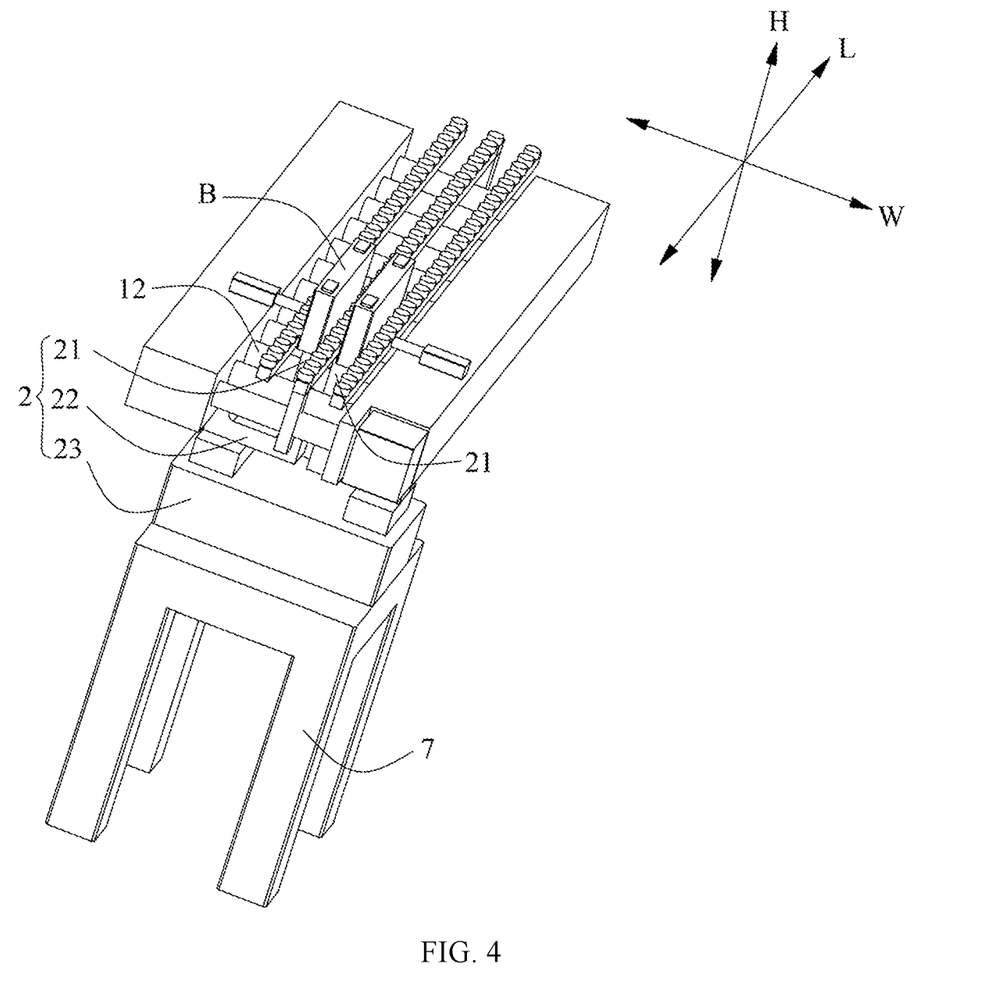
FIG. 4 is a schematic diagram of a position relationship between a weighing mechanism and a conveying mechanism during weighing.
Figure 5:
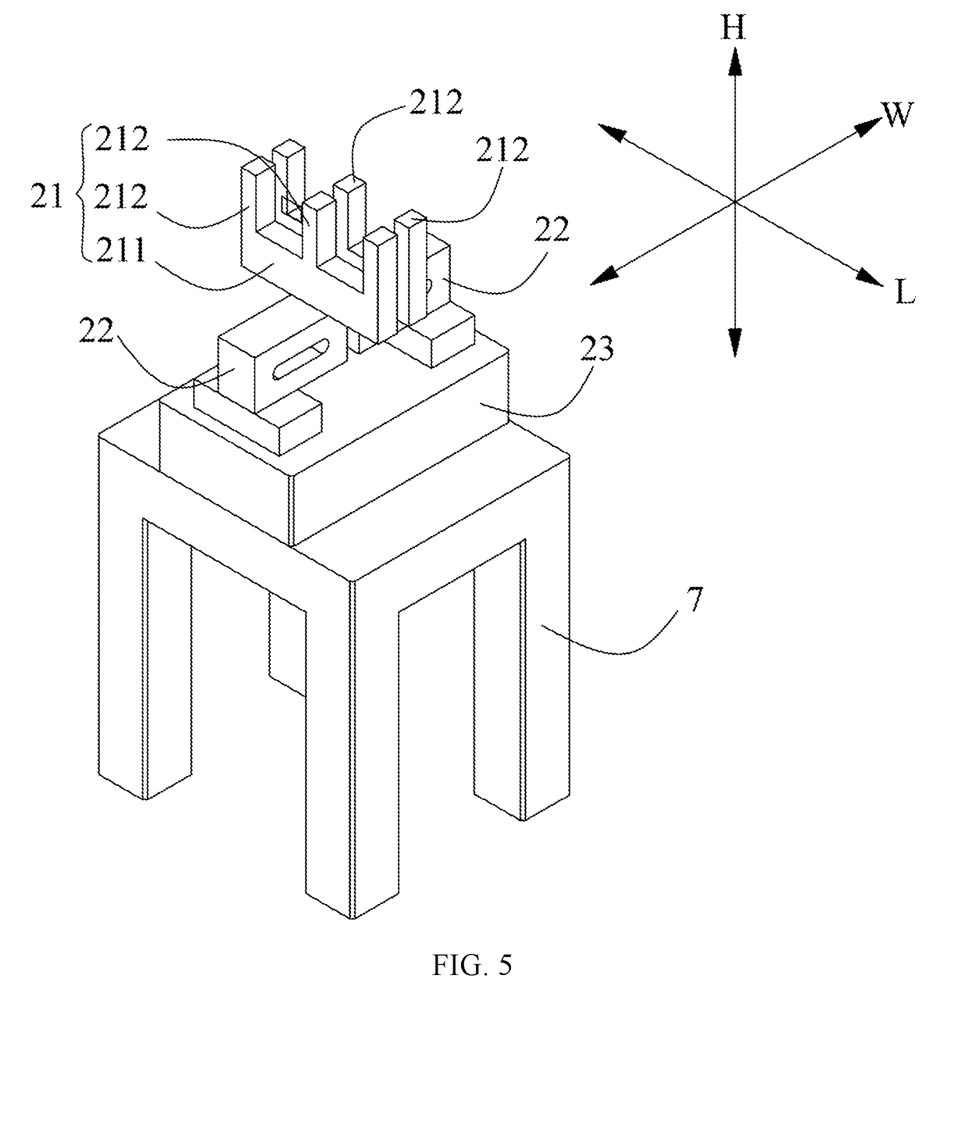
FIG. 5 is a mounting schematic diagram of a weighing mechanism and a second fixed frame of a liquid injection device.

Referring to FIGS. 4 and 5, the weighing supporting block 21 is configured to directly support the battery B during weighing. The weighing supporting block 21 may include: a main body portion 211, positioned above the weighing sensor 22; and a plurality of protruded portions 212, spaced along the length direction L. Each protruded portion 212 is protruded out of the main body portion 211 along the height direction H. The plurality of protruded portions 212 are respectively positioned between the corresponding two conveying rollers 12 during weighing and extend above the corresponding conveying rollers 12 for supporting the battery B. Here, the plurality of protruded portions 212 jointly support the battery B during weighing so as to ensure that a center of gravity of the battery B is consistent with a center of gravity of the weighing sensor 22, thereby improving the weighing stability of the weighing mechanism 2.

Referring to FIG. 5, the weighing sensor 22 is positioned below the weighing supporting block 21 and is configured to transmit weight data of the battery B to the control system during weighing. Here, the weighing mechanism 2 uses the weighing sensor 22 to replace the traditional electronic scale, so that cost is saved, occupied space is reduced and the problem about the weighing precision caused by dry wind in the electronic scale is solved, thereby reducing weighing error.

Referring to FIG. 5, the second supporting plate 23 is positioned between the weighing sensor 22 and the second fixed frame 7 and is configured to support the weighing sensor 22, the weighing supporting block 21 and the battery B positioned on the weighing supporting block 21. To further improve the weighing stability of the weighing mechanism 2, the second supporting plate 23 may be a marble platform.

Referring to FIGS. 1 to 3, the lifting mechanism 3 is configured to generate relative motion between the conveying mechanism 1 and the weighting mechanism 2 to transfer the battery B on the conveying mechanism 1 to the weighing mechanism 2. The weighing mechanism 2 is arranged below the conveying mechanism 1 and the traditional mechanism arm is replaced by the lifting mechanism 3, thus avoiding the risk that the battery falls in the transfer process to damage the weighing mechanism 2. Specifically, the lifting mechanism 3 may include a cylinder body 31 and a telescopic rod 32.

In one embodiment, the cylinder body 31 of the lifting mechanism 3 is fixed to the first fixed frame 6. One end of the telescopic rod 32 is telescopically connected to the cylinder body 31 and the other end of the telescopic rod 32 is fixedly connected to the conveying mechanism 1. When the battery B moves to a weighing position under the action of the conveying mechanism 1, the telescopic rod 32 of the lifting mechanism 3 drives the conveying mechanism 1 to entirely move downwards, the battery B is separated from the conveying rollers 12 of the conveying mechanism 1 and the plurality of protruded portions 212 of the weighing supporting block 21 extend between the corresponding two conveying rollers 12 to above the corresponding conveying rollers 12 and support the battery B at this time; therefore, the battery B on the conveying mechanism 1 is transferred to the weighing mechanism 2. When it is necessary to convey the battery B again through the conveying mechanism 1, the conveying mechanism 1 entirely moves upwards under the action of the lifting mechanism 3.

Specifically, to improve the stability of the conveying mechanism 1, referring to FIGS. 1 to 3, there may be two lifting mechanisms 3. The cylinder body 31 of each of the lifting mechanisms 3 is fixed to the first fixed frame 6, and the other end of the telescopic rod 32 is fixedly connected to one corresponding first supporting plate 14 of the conveying mechanism 1. When the battery B moves to the weighing position under the action of the conveying mechanism 1, the telescopic rod 32 of each of the lifting mechanisms 3 downwards pulls the first supporting plate 14 corresponding to the conveying mechanism 1, and the conveying mechanism 1 entirely moves downwards, so that the weighing mechanism 2 supports the battery B and weighs the battery B.

In another embodiment, the cylinder body 31 of the lifting mechanism 3 is fixed to the second fixed frame 7. One end of the telescopic rod 32 is telescopically connected to the cylinder body 31 and the other end of the telescopic rod 32 is fixedly connected to the weighing mechanism 2. When the battery B moves to a weighing position under the action of the conveying mechanism 1, the telescopic rod 32 of the lifting mechanism 3 drives the weighing mechanism 2 to entirely move upwards, the plurality of protruded portions 212 of the weighing supporting block 21 extend between the corresponding adjacent two conveying rollers 12 to above the corresponding conveying rollers 12 and support the battery B, and the battery B is separated from the conveying rollers 12 of the conveying mechanism at this time; therefore, the battery B on the conveying mechanism 1 is transferred to the weighing mechanism 2. When it is necessary to convey the battery B again through the conveying mechanism 1, the weighing mechanism 2 entirely moves downwards under the action of the lifting mechanism 3.

Specifically, there may be one lifting mechanism 3. The cylinder body 31 of the lifting mechanism 3 is fixed to the second fixed frame 7, and the other end of the telescopic rod 32 is fixedly connected to the second supporting plate 23 of the weighing mechanism 2. When the battery B moves to the weighing position under the action of the conveying mechanism 1, the telescopic rod 32 of the lifting mechanism 3 upwards pulls the second supporting plate 23 of the weighing mechanism 2, and the weighing mechanism 2 entirely moves upwards at this time, so that the weighing mechanism 2 supports the battery B and weighs the battery B.

Referring to FIGS. 2 and 3, the lifting mechanism 3 may further include: a guide rod 33 which is parallel to the telescopic rod 32 in the height direction H. There may be one or more guide rods 33.

When the cylinder body 31 of the lifting mechanism 3 is fixedly arranged on the first fixed frame 6, the first fixed frame 6 is provided with a guide hole (not shown) along the height direction H. One end of each of the guide rods 33 is fixedly connected to one corresponding first supporting plate 14 of the conveying mechanism 1 and the other end of each of the guide rods 33 passes through the guide hole of the first fixed frame 6. When the conveying mechanism 1 moves up and down under the action of the lifting mechanism 3, the guide rod 33 moves up and down in the guide hole of the first fixed frame 6. Here, based on the guide rod 33, the stability of the conveying mechanism 1 in the up-and-down motion process is improved.

When the cylinder body 31 of the lifting mechanism 3 is fixedly arranged on the second fixed frame 7, the second fixed frame 7 is provided with a guide hole (not shown) along the height direction H. One end of each guide rod 33 is fixedly connected to the second supporting plate 23 of the weighing mechanism 2, and the other end of each guide rod 33 passes through the guide hole of the second fixed frame 7. When the weighing mechanism 2 moves up and down under the action of the lifting mechanism 3, the guide rod 33 moves up and down in the guide hole of the second fixed frame 7. Here, based on the guide rod 33, the stability of the weighing mechanism 2 in the up-and-down motion process is improved.

Referring to FIGS. 1 to 3, the guide mechanism 4 includes a first guide plate 41, a second guide plate 42 and a power member 43. The first guide plate 41 is positioned on one side of the battery B along the width direction W, and the second guide plate 42 is positioned on the other side of the battery B along the width direction W. The power member 43 is fixedly connected to the second guide plate 42 and is configured to drive the second guide plate 42 to move relative to the first guide plate 41 along the width direction W. When the conveying mechanism 1 conveys the battery B, the second guide plate 42 and the first guide plate 41 are spaced from the battery B along the width direction W. When the conveying mechanism 1 conveys the battery B to the weighing position, the second guide plate 42 moves towards the first guide plate 41 under the action of the power member 43 until the battery B is clamped with the first guide plate 41. When the second guide plate 42 and the first guide plate 41 clamp the battery B together, the lifting mechanism 3 transfers the battery B on the conveying mechanism 1 to the weighing mechanism 2, and the weighing mechanism 2 supports the battery B and weighs the battery B.

In the liquid injection device of the present disclosure, a distance between the second guide plate 42 and the first guide plate 41 of the guide mechanism 4 may be adjusted by the power member 43, so that the liquid injection device of the present disclosure may be compatible with batteries B with different models. It is unnecessary to perform model change operation when the model of the battery B is changed, thus improving production efficiency. When the conveying mechanism 1 conveys the battery B, the gap between the second guide plate 42 and the first guide plate 41 forms a guide channel of the battery B in the length direction L, so that the guide mechanism 4 may limit the battery B in the width direction W, thus preventing the battery B from being deviated towards two sides of the width direction W in the conveying process. Furthermore, when the weighing mechanism 2 weighs the battery B, the battery B is fixed by the guide mechanism 4, so that shaking of the battery B is avoided and the weighing error is greatly reduced.

Referring to FIG. 1, the first guide plate 41 may include: a guide portion 411, positioned above the plurality of conveying rollers 12 and arranged between the two mounting plates 11 of the conveying mechanism 1; and two supporting portions 412, positioned at two ends of the guide portion 411 along the length direction L, each of the supporting portions 412 being fixed to one corresponding first supporting plate 14 of the conveying mechanism 1 to support the guide portion 411. The second guide plate 42 is positioned above the plurality of conveying rollers 12 and arranged between the two mounting plates 11 of the conveying mechanism 1. The power member 43 is fixed to the mounting plates 11 of the conveying mechanism 1. The power member 43 may be an air cylinder.

The number of the power member 43 is consistent with the number of the second guide plate 42. In one embodiment, there may be one second guide plate 42. The second guide plate 42 is positioned on one side of the first guide plate 41 along the width direction W. At this time, the batteries B placed on the conveying mechanism 1 are in a row along the width direction W. In another embodiment, referring to FIGS. 1 to 4, there may be two second guide plates 42. The two second guide plates 42 are positioned on two sides of the first guide plate 41 along the width direction W, and the batteries B placed on the conveying mechanism 1 are in two rows along the width direction W at this time, thereby weighing the two batteries B at the same time and improving production efficiency.

Referring to FIGS. 1 to 3, the positioning mechanism 5 is proximal to the weighing mechanism 2 and fixed to the conveying mechanism 1 for limiting the weighing position of the battery B in the length direction L.

Specifically, referring to FIG. 2, the positioning mechanism 5 may include: a fixed portion 51; an extending portion 52, connected to the fixed portion 51 and extending along the height direction H; and a stop portion 53, connected to the extending portion 52 and extending along the length direction L. The fixed portion 51 of the positioning mechanism 5 is fixed to the first supporting plate 14 of the conveying mechanism 1, the extending portion 52 is arranged between the second guide plate 42 and the first guide plate 41, and the stop portion 53 faces towards the battery B and is configured to stop the battery B in the length direction L. When the battery B moves towards the weighing mechanism 2 under the action of the conveying mechanism 1 until being stopped by the stop portion 53 of the positioning mechanism 5, the driving member 13 of the conveying mechanism 1 stops work, and the second guide plate 42 and the first guide plate 41 of the guide mechanism 4 clamp the battery B together at this time, thus accurately positioning the battery B.

Referring to FIGS. 1 to 5, the first fixed frame 6 is configured to mount the conveying mechanism 1, and the second fixed frame 7 is spaced from the first fixed frame 6 for mounting the weighing mechanism 2. Based on the arrangement of the first fixed frame 6 and the second fixed frame 7, the conveying mechanism 1 and the weighing mechanism 2 are independent of each other, so that the influence on weighing by the shaking of the conveying mechanism 1 is avoided when the weighing mechanism 2 weighs the battery B, thereby reducing weighing error.

In one embodiment, there may be one first fixed frame 6. The first fixed frame 6 is provided with a hollow region, and the weighing mechanism 2 and the second fixed frame 7 are arranged in the hollow region and below the hollow region of the first fixed frame 6.

In another embodiment, there may be two first fixed frames 6. The two first fixed frames 6 are spaced along the length direction L. Each first fixed frame 6 supports one corresponding first supporting plate 14 of the conveying mechanism 1. The second fixed frame 7 is positioned between the two first fixed frames 6 along the length direction L.

What is claimed is:
1. A liquid injection device, comprising:
a conveying mechanism, conveying a battery along a length direction;

a weighing mechanism, positioned below the conveying mechanism along a height direction; and a lifting mechanism, configured to generate relative motion between the conveying mechanism and the weighting mechanism to transfer the battery on the conveying mechanism to the weighing mechanism;

the liquid injection device further comprises a guide mechanism;

the guide mechanism comprises a first guide plate positioned on one side of the battery along a width direction, a second guide plate positioned on the other side of the battery along the width direction, and a power member fixedly connected to the second guide plate for driving the second guide plate to move relative to the first guide plate along the width direction;

when the conveying mechanism conveys the battery, the second guide plate and the first guide plate are spaced from the battery along the width direction; and when the weighing mechanism weighs the battery, the second guide plate and the first guide plate clamp the battery together.

2. The liquid injection device according to claim 1, wherein the number of the power member is consistent with the number of the second guide plate.

3. The liquid injection device according to claim 2, wherein there is one second guide plate, the second guide plate being positioned on one side of the first guide plate along the width direction.

4. The liquid injection device according to claim 2, wherein there are two second guide plates, the two second guide plates being positioned on two sides of the first guide plate along the width direction.

5. The liquid injection device according to claim 1, further comprising a first fixed frame configured to mount the conveying mechanism, and a second fixed frame spaced from the first fixed frame and configured to mount the weighing mechanism.

6. The liquid injection device according to claim 5, wherein the conveying mechanism comprises two mounting plates positioned above the first fixed frame and spaced along the width direction, a plurality of conveying rollers spaced along the length direction, each of the conveying rollers being rotatably mounted between the two mounting plates, and a driving member driving the plurality of conveying rollers to rotate to convey the battery.

7. The liquid injection device according to claim 6, wherein the first guide plate of the guide mechanism comprises: a guide portion, positioned above the plurality of conveying rollers and arranged between the two mounting plates of the conveying mechanism; and two supporting portions, positioned at two ends of the guide portion along the length direction for supporting the guide portion; and the second guide plate is positioned above the plurality of conveying rollers and arranged between the two mounting plates of the conveying mechanism, and the power member is fixed to the mounting plates of the conveying mechanism.

8. The liquid injection device according to claim 6, wherein the weighing mechanism comprises a weighing supporting block configured to support the battery during weighing, and a weighing sensor positioned below the weighing supporting block.

9. The liquid injection device according to claim 8, wherein the weighing supporting block comprises a main body portion positioned above the weighing sensor, and a plurality of protruded portions spaced along the length direction, each of the protruded portions being protruded out of the main body portion along the height direction, and the plurality of protruded portions are respectively positioned between the corresponding adjacent two conveying rollers, extending above the corresponding conveying rollers and supporting the battery when in weighing.

10. The liquid injection device according to claim 8, wherein the lifting mechanism comprises a cylinder body and a telescopic rod, one end of the telescopic rod being telescopically connected to the cylinder body and the other end of the telescopic rod being fixedly connected to the conveying mechanism.

11. The liquid injection device according to claim 10, wherein the conveying mechanism further comprises two first supporting plates spaced along the length direction, each of the first supporting plates being positioned between the two mounting plates and the first fixed frame;

there are two lifting mechanisms, the cylinder body of each of the lifting mechanisms is fixed to the first fixed frame, and the other end of the telescopic rod is fixedly connected to one first supporting plate of the conveying mechanism; and after the conveying mechanism descends under the action of the lifting mechanism, the weighing mechanism supports the battery and weighs the battery.

12. The liquid injection device according to claim 10, wherein the weighing mechanism further comprises a second supporting plate positioned between the weighing sensor and the second fixed frame;

there is one lifting mechanism, the cylinder body of the lifting mechanism is fixed to the second fixed frame, and the other end of the telescopic rod is fixedly connected to the second supporting plate of the weighing mechanism; and after the weighing mechanism ascends under the action of the lifting mechanism, the weighing mechanism supports the battery and weighs the battery.

13. The liquid injection device according to claim 8, wherein the lifting mechanism comprises a cylinder body and a telescopic rod, one end of the telescopic rod being telescopically connected to the cylinder body and the other end of the telescopic rod being fixedly connected to the weighing mechanism.

14. The liquid injection device according to claim 13, wherein the conveying mechanism further comprises two first supporting plates spaced along the length direction, each of the first supporting plates being positioned between the two mounting plates and the first fixed frame;

there are two lifting mechanisms, the cylinder body of each of the lifting mechanisms is fixed to the first fixed frame, and the other end of the telescopic rod is fixedly connected to one first supporting plate of the conveying mechanism; and after the conveying mechanism descends under the action of the lifting mechanism, the weighing mechanism supports the battery and weighs the battery.

15. The liquid injection device according to claim 13, wherein
- the weighing mechanism further comprises a second supporting plate positioned between the weighing sensor and the second fixed frame;
- there is one lifting mechanism, the cylinder body of the lifting mechanism is fixed to the second fixed frame, and the other end of the telescopic rod is fixedly connected to the second supporting plate of the weighing mechanism; and
- after the weighing mechanism ascends under the action of the lifting mechanism, the weighing mechanism supports the battery and weighs the battery.

* * * * *